US007117142B1

(12) United States Patent  
Kaptsan

(10) Patent No.: US 7,117,142 B1
(45) Date of Patent: Oct. 3, 2006

(54) SYMBOLIC CONCEPTUAL DESIGN MODEL DEVELOPMENT ENVIRONMENT

(76) Inventor: Igor Kaptsan, 884 Williamsburg Blvd., Downingtown, PA (US) 19335

( * ) Notice: Subject to any disclaimer, the term of this patent is extended or adjusted under 35 U.S.C. 154(b) by 740 days.

(21) Appl. No.: 10/361,236

(22) Filed: Feb. 10, 2003

Related U.S. Application Data

(60) Provisional application No. 60/357,154, filed on Feb. 14, 2002.

(51) Int. Cl.
*G06F 9/45* (2006.01)

(52) U.S. Cl. ........................ 703/22; 707/202; 707/203; 707/204; 707/8; 715/500.1; 715/511; 715/512

(58) Field of Classification Search ............... 703/4, 703/22; 715/500.1, 502, 503, 511, 512, 769, 715/803; 707/201–204, 2, 5, 8; 434/308; 717/104; 706/53
See application file for complete search history.

(56) References Cited

U.S. PATENT DOCUMENTS

| | | | | | |
|---|---|---|---|---|---|
| 4,964,063 | A | * | 10/1990 | Esch ........................... | 706/53 |
| 5,504,851 | A | * | 4/1996 | Maesano et al. ............. | 715/803 |
| 5,572,732 | A | * | 11/1996 | Fant et al. .................... | 717/104 |
| 5,805,461 | A | * | 9/1998 | Fant et al. .................... | 703/6 |
| 6,097,927 | A | * | 8/2000 | LaDue ......................... | 434/308 |
| 6,259,889 | B1 | * | 7/2001 | LaDue ......................... | 434/308 |
| 6,629,097 | B1 | * | 9/2003 | Keith ........................... | 707/5 |

OTHER PUBLICATIONS

Ho et al., D.W.C. Symbolic Manipulation of Transfer Functions and State Space Realizations, IEEE Transactions on Education, vol. 39, No. 2, May 1996, pp. 230-242.*

Kendall et al., E.A. Role Model Designs and Implementations with Aspect-Oriented Programming, ACM SGPLAN Notices, Proceedings of the 14th ACM SIGPLAN Conference on Object-Oriented Programming, Systems, Languages, and Applications, Oct. 1999, pp. 353-369.*

Palesis et al., J.A. Transforming Mathematical Product Evaluation Models into Expert Systems for Product Design, Proceedings of the 3rd International Conference on Industrial and Engineering Applications of Artificial Intelligence and Expert Systems, vol. 1, Jun. 1990, pp. 404-415.*

(Continued)

*Primary Examiner*—Russell Frejd

(74) *Attorney, Agent, or Firm*—Donald J. Ersler

(57) ABSTRACT

A symbolic design model development environment includes an information-linking program, an object store, a symbolic modeling program, and at least one input document. Each input document contains a constraint or parameter for the design of some device. The symbolic modeling program contains a symbolic modeling window for the graphical illustration of a plurality of symbolic modeling components such as constraints, parameters, notices and interrelationships. The symbolic modeling components are stored in an icon palette. The linking program provides a connection of the at least one input document to the symbolic modeling program through the object store. The user drags and drops various symbolic modeling components from the icon palette to the symbolic modeling window. The symbolic modeling components once they are entered into the symbolic modeling window place constraints on the design of a device.

19 Claims, 13 Drawing Sheets

OTHER PUBLICATIONS

Chrisman et al., C. Entity Relationship Models as a Tool for Data Analysis and Design, ACM SIGCSE Bulletin, Proceedings of the 17th SIGCSE Technical Symposium on Computer Science Education, Feb. 1986, pp. 8-14.*

Kim et al., G.J. Interleaving Assembly Planning and Design, IEEE Transactions on Robotics and Automation, vol. 12, No. 2, Apr. 1996, pp. 245-251.*

Rogers et al., C.D. MCNC's Vertically Integrated Symbolic Design System, IEEE, 22nd Conference on Design Automation, Jun. 1985, pp. 63-68.*

Rharmaoui et al., A. Integration of Know-How in CAD/CAM Systems: A Way to Improve the Design Process, Proceedings of IECON '93—19th Annual Conference of IEEE Industrial Electronics, Nov. 1993, pp. 547-552.*

* cited by examiner

SYMBOLIC CONCEPTUAL DESIGN MODEL DEVELOPMENT ENVIRONMENT

CROSS-REFERENCES TO RELATED APPLICATIONS

This is a utility patent application taking priority from provisional patent application Ser. No. 60/357,154 filed on Feb. 14, 2002.

BACKGROUND OF THE INVENTION

1. Field of the Invention

The present invention relates generally to design models and more specifically, to a symbolic conceptual design model development environment that allows the linking of specific items of information contained within files of different formats to an object store for the purpose of creating a symbolic conceptual design model.

2. Discussion of the Prior Art

Current processes for the design of products of all sorts are only partly automated. In particular, in the conceptual design phase, the designer is typically given an assemblage of materials that constrain the desired design without consideration of their mutual consistency or completeness. Moreover, these materials have no standard format or language; they may be Word files, e-mails, CAD files, and other forms of information, each containing one or more pieces of information to constrain the desired design, such as dimensions, weight, or thermal considerations.

Furthermore, the conceptual design process is presently effected by largely manual techniques. The notes and sketches designers produce during this phase are seldom preserved. So the designers' employers retain no record of the decisions made during conceptual design-decisions whose documentation could prove very valuable to the employers for subsequent work. But most engineers cannot be compelled to preserve such documentation, as they view it as personal work-in-process, and its clarification for posterity as being irrelevant to the task at hand. Moreover, they are uncomfortable with typing as a method of data entry.

Accordingly, there is a clearly felt need in the art for a symbolic conceptual design model development environment that automates the conceptual design process, in a manner that does not impose an additional burden of documentation upon the design engineer the result of that is the creation of a symbolic model of a design. In this symbolic model are preserved both the decisions made in the conceptual design process, and the reasons for them as well as the design choices that were considered but rejected. All this is preserved in a form that other designers can examine and re-use.

SUMMARY OF THE INVENTION

The present invention provides for a symbolic design model development environment through the linking of specific items of information contained within files of different formats to an object store. The symbolic design model development environment includes an information-linking program, an object store, a symbolic modeling program, and at least one input document. The user starts with any acceptable input document and marks parameters and constraints of interest, then links them to symbolic modeling components by a graphical process. Additional symbolic modeling components can then be added with the symbolic modeling program, to complete the model. All links are actually between the input documents and the object store. The symbolic model is a representation of the state of the object store.

The symbolic model is thus linked to parameters and constraints in a variety of input documents, by way of the object store. Changes in the parameters and constraints in either end of the link may affect the parameters and constraints on the other end of the link.

The user may use information from word processors, e-mail, spreadsheets, and other information files. The information may be dimensions, weights, heights, power requirements, temperature limits, and other design parameters.

The marked information in the input document is dragged and dropped to a field on a selected symbolic model component. Symbolic modeling components are selected as icons from within palettes in the symbolic modeling program. The icons include filtering of the data exchange, such as logical relationships. For example, "If weight>100 kg then send flag."

The links between the symbolic model and input documents may be maintained such that any change to a parameter on either end of the link is reflected by a similar change on the other end of the link. When marked information in the symbolic model or input document changes, the marked information in the input document or symbolic model is capable of also reflecting the change. The links may work in one or both directions. An information change is capable of causing an update to be made in one direction with a unidirectional link. An information change is capable of causing an update to be made in either direction with a bi-directional link.

A flow-chart-like diagram of the relationships between the symbolic model file and the data files may be displayed in a viewing window. The flow-chart-like diagram may be directly edited, and links can be added or deleted, along with symbolic modeling components. Editing can include the addition and deletion of links and symbolic-modeling components, effected in a way similar to the original creation process-that is, by dragging and dropping.

The flow-chart-like diagrams can be named and saved to allow the organization to retain the full scope of the conceptual design decisions, and to re-use them where appropriate. Even sequences of decisions that do not lead to action can be thus preserved, conserving the value of the research invested in them.

It is preferable to have the symbolic design model development environment available for multiple users. A design-community agent program would allow the multiple users to access the symbolic model during the design process. Preferably, access to the publisher utility would be over the Internet.

Accordingly, it is an object of the present invention to provide a symbolic design modeling development environment that automates the conceptual design process.

It is a further objective of the present invention to provide a symbolic design modeling development environment that relieves a user of the burden of documentation.

It is yet a further objective of the present invention to provide a symbolic design modeling environment that conserves the knowledge developed in the exploration of design alternatives that do not lead to action.

Finally, it is another object of the present invention to provide a symbolic design modeling development environment that allows a multitude of users to review the design process as it occurs.

These and additional objects, advantages, features and benefits of the present invention will become apparent from the following specification.

DETAILED DESCRIPTION OF THE PREFERRED EMBODIMENTS

Figure 1:
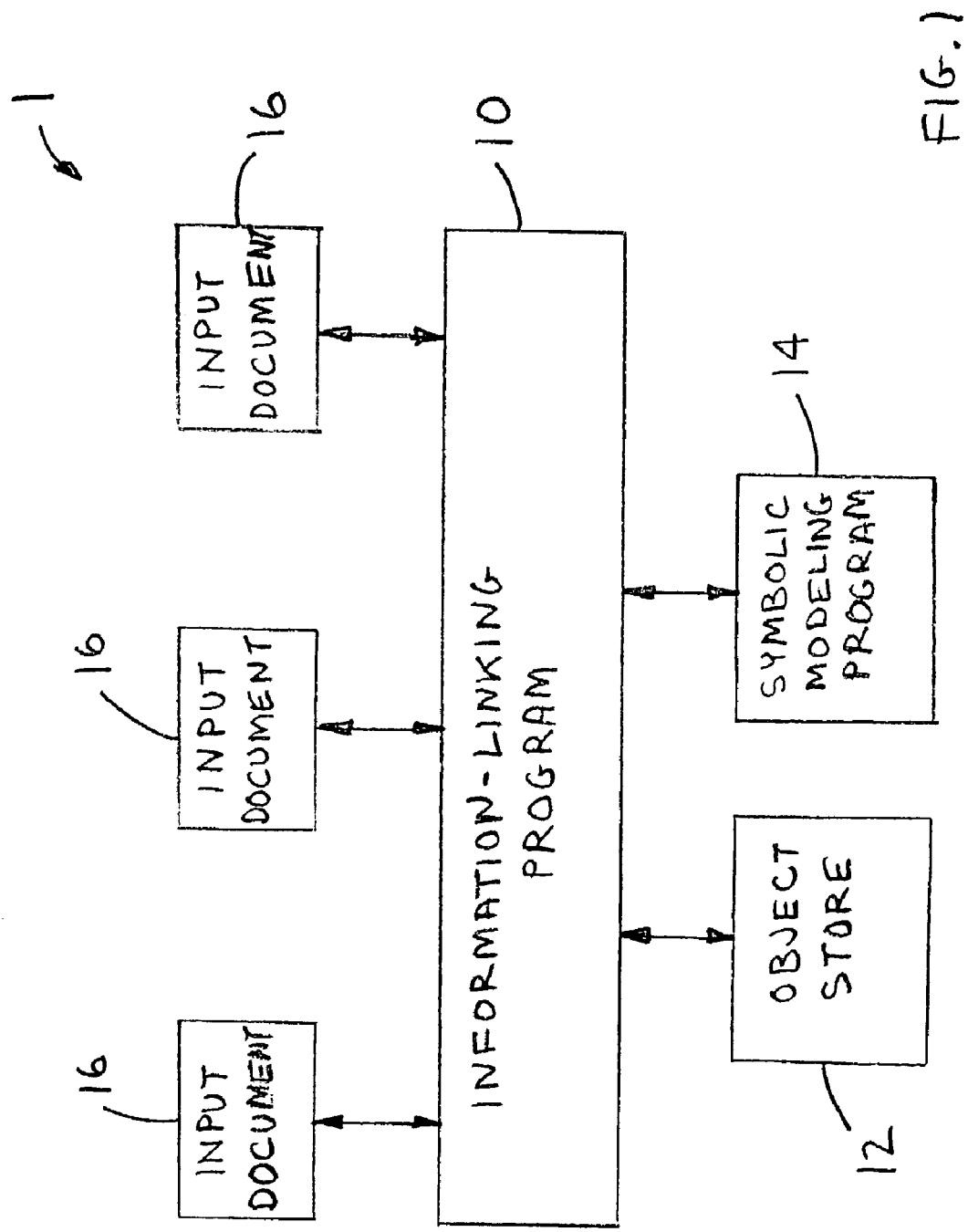
FIG. 1 is a block diagram of a symbolic conceptual design model development environment.

With reference now to the drawings, and particularly to FIG. 1, there is shown a symbolic conceptual design model development environment 1. The symbolic conceptual design model development environment 1 includes an information-linking program 10, an object store 12, a symbolic modeling program 14, and at least one input document 16. Each input document 16 could be a Word document, an e-mail, a CAD file, a html file, a spreadsheet, or any other form of information.

Each input document 16 contains at least one piece of information concerning the desired design project such as a dimension, weight, thermal limit, specification, constrain or any other parameter. Each input document 16 is connected to the information-linking program 10. The connection between each input document 16 and the information-linking program 10 may be made in only one direction or in both directions. The object store 12 is connected to the information-linking program 10 in both directions and the symbolic modeling program 14 is connected in both directions.

Figure 2:
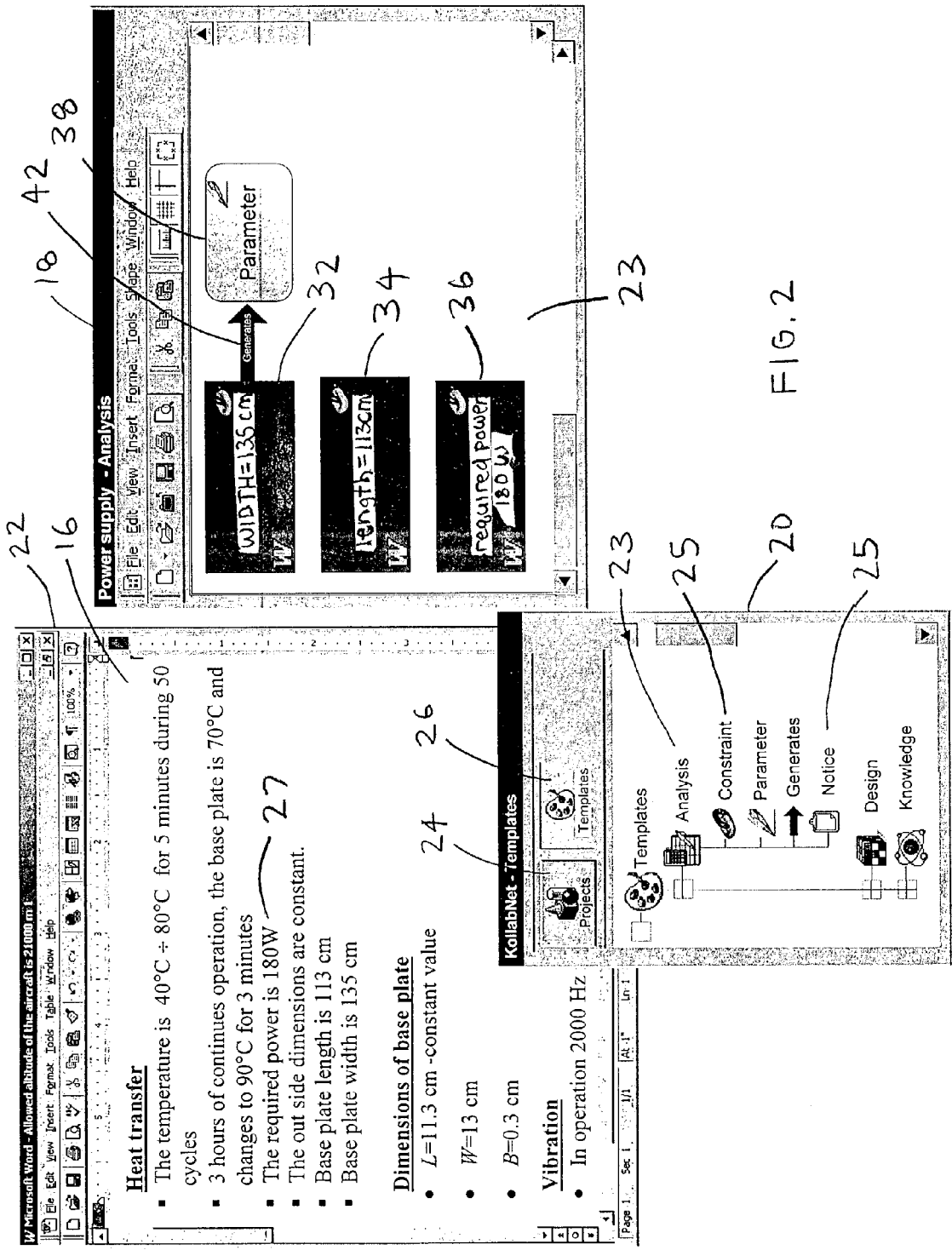
FIG. 2 is a front view of an input document window, icon palette and a symbolic modeling window of a symbolic conceptual design model development environment.

With reference to FIG. 2, the symbolic modeling program 14 includes a symbolic modeling window 18, an icon palette 20, and input file window 22. The icon palette 20 is also a window. The symbolic modeling window 18 provides a graphical illustration or an analysis 23 of a plurality of symbolic modeling components 25 such as constrains, parameters, notices and their interrelationships with each other. The icon palette 20 includes a projects button 24 and a templates button 26. Depressing the projects button 24 provides a directory of projects stored in the icon palette 20. Depressing the templates button 26 provides a directory of various symbolic modeling components 25. The input file window 22 allows an input file 16 to be marked or highlighted.

The analysis 23 of a particular design project is created by transferring symbolic modeling components 25 from the icon palette 20 to the symbolic modeling window 18 and by transferring parameters 27 from the at least one input document 16 to the symbolic modeling window 18. Either transfer may be implemented by dragging and dropping, but other transfer methods may also be used.

Figure 3:
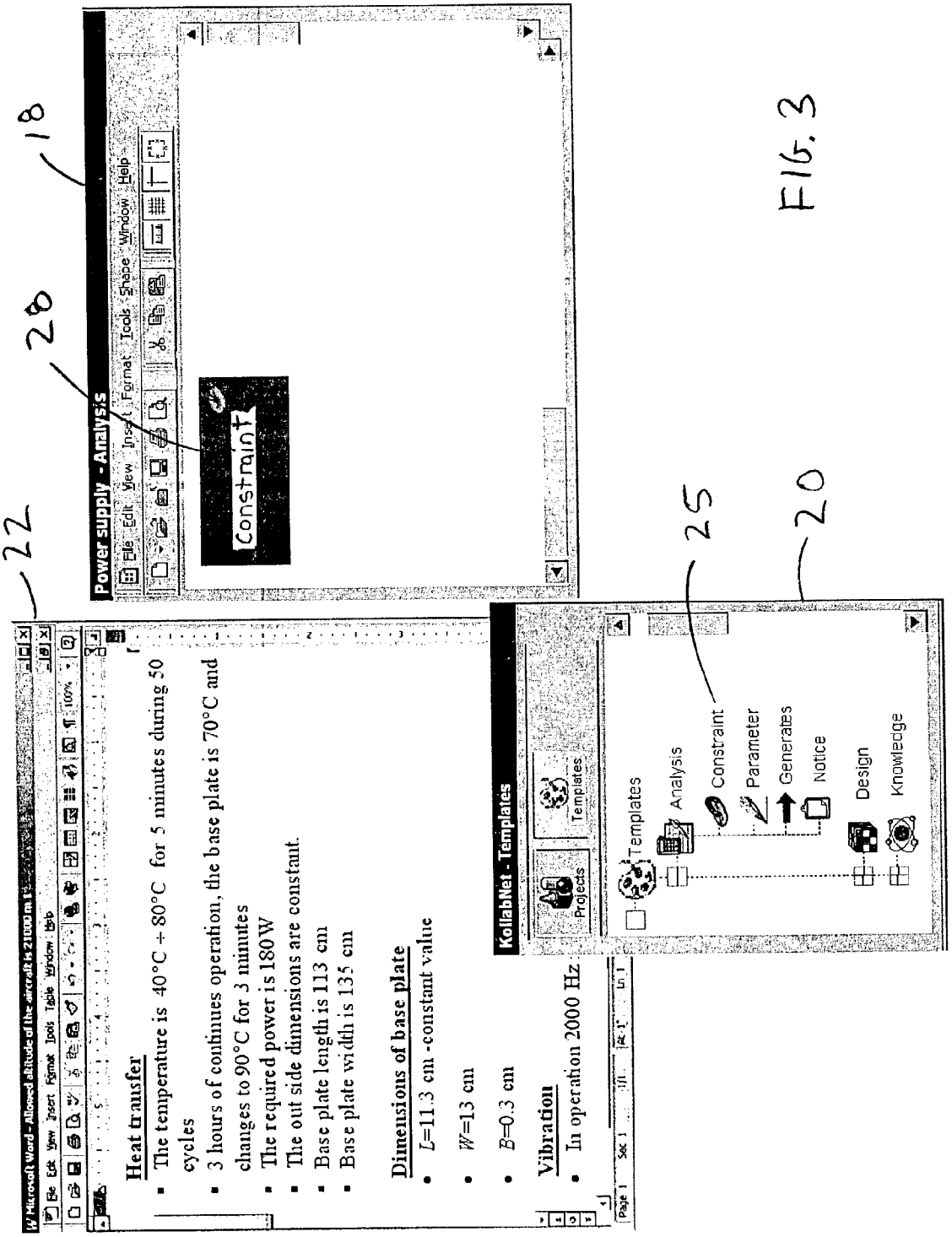
FIG. 3 is a view of an input document window, icon palette and a symbolic modeling window with a constraint transferred from the icon palette.
Figure 4:
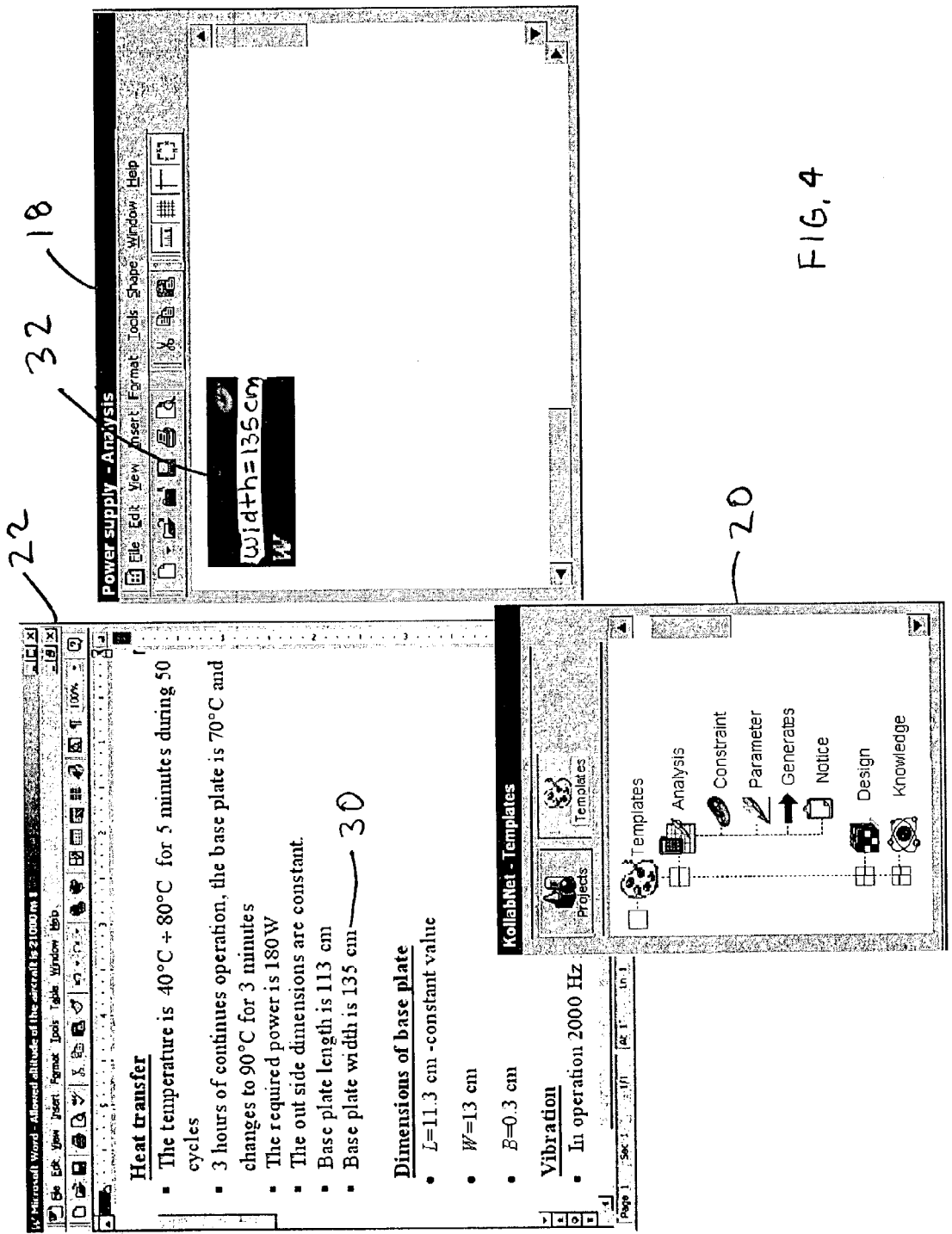
FIG. 4 is a front view of an input document window, icon palette and a symbolic modeling window with a dimension transferred from the input document window.

The following procedure is given by way of example and not by way of limitation. With reference to FIG. 3, a constraint symbol listed in the icon palette 20 is transferred to the symbolic modeling window 18. The constraint symbol from the icon palette is shown as a parameter box 28 on the symbolic modeling window 18. With reference to FIG. 4, a dimension parameter 30 is highlighted in the input file 16. The dimension parameter 30 is transferred to the constrain box 28 and the dimension parameter 30 appears as a dimension constraint 32 in the symbolic modeling window 18. FIG. 2 shows other design parameters 34 and 36 that have been added to the analysis 23.

The function of each design parameter may be defined. To define a design parameter, a parameter symbol is transferred from the icon palette 20 to the symbolic modeling window 18. The transferred parameter symbol initially appears as a box 38 on the symbolic modeling window 18. The transferred parameter symbol also displays a pop-up menu (not shown). The pop-up menu allows the box 38 to be named and a relationship such as a formula to be entered.

Figure 5:
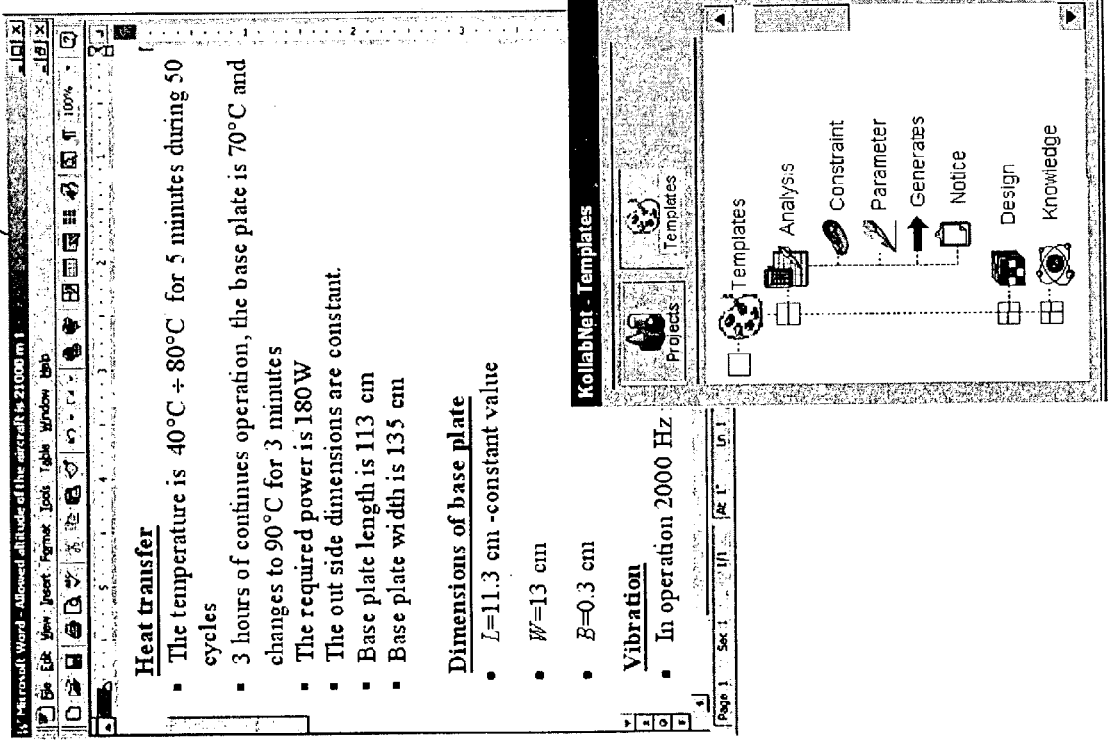
FIG. 5 is a front view of an input document, icon palette and a symbolic modeling window after a parameter has been named to form a design block.
Figure 6:
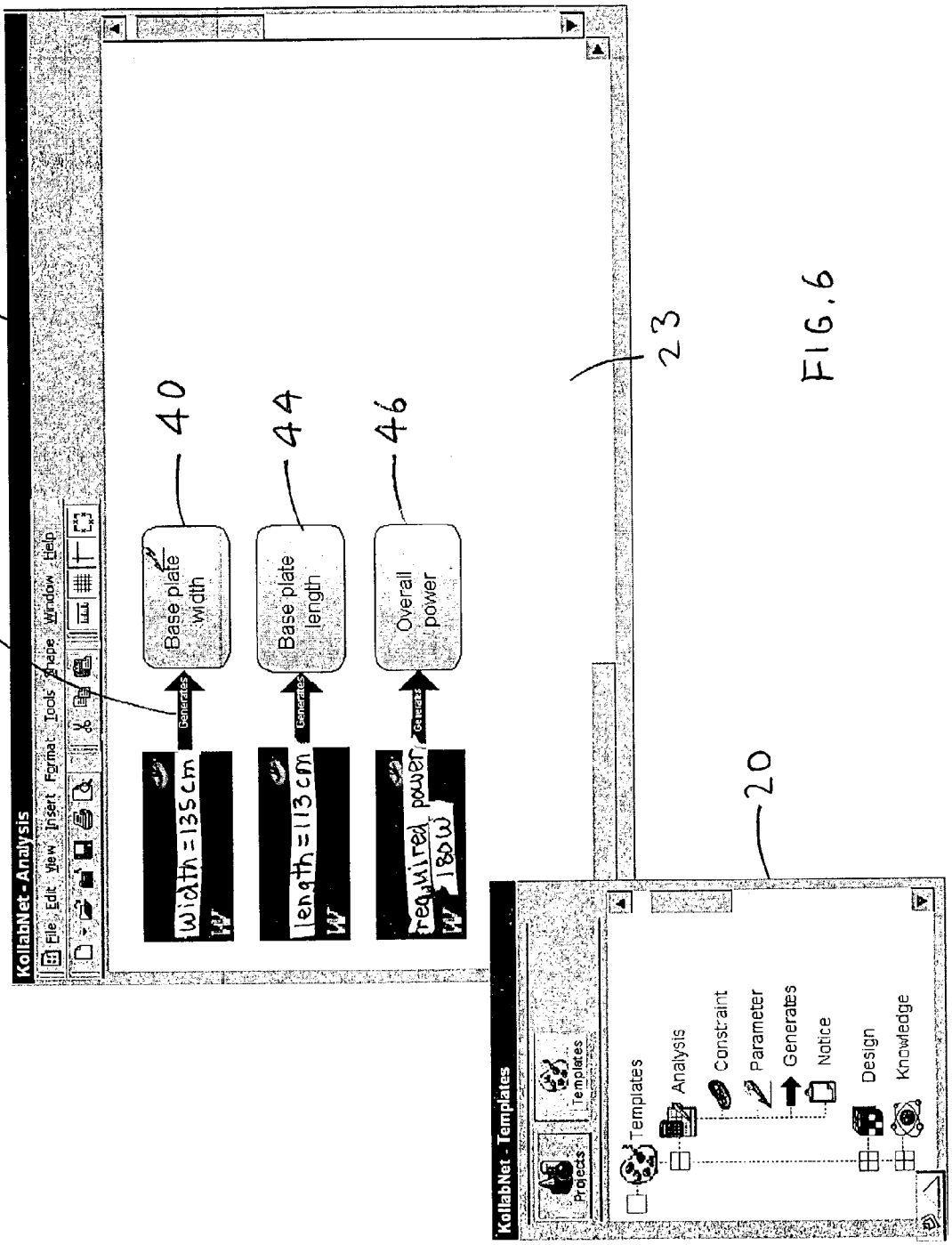
FIG. 6 is a front view of an icon palette and a symbolic modeling window with other design blocks added thereto.

With reference to FIG. 5, after the parameter box 38 has been named it, becomes a design block 40. A generates symbol 42 is also transferred from the icon palette 20 to the symbolic modeling window 18 between the dimension constraint 32 and the design block 40. The generates symbol 42 constrains the base plate to have a width of 135 cm. With reference to FIG. 6, design blocks 44 and 46 are added for a base plate length and the overall power, respectively. Design blocks may be stored on in the icon palette 20 and copied to an analysis of a particular project file.

Figure 7:
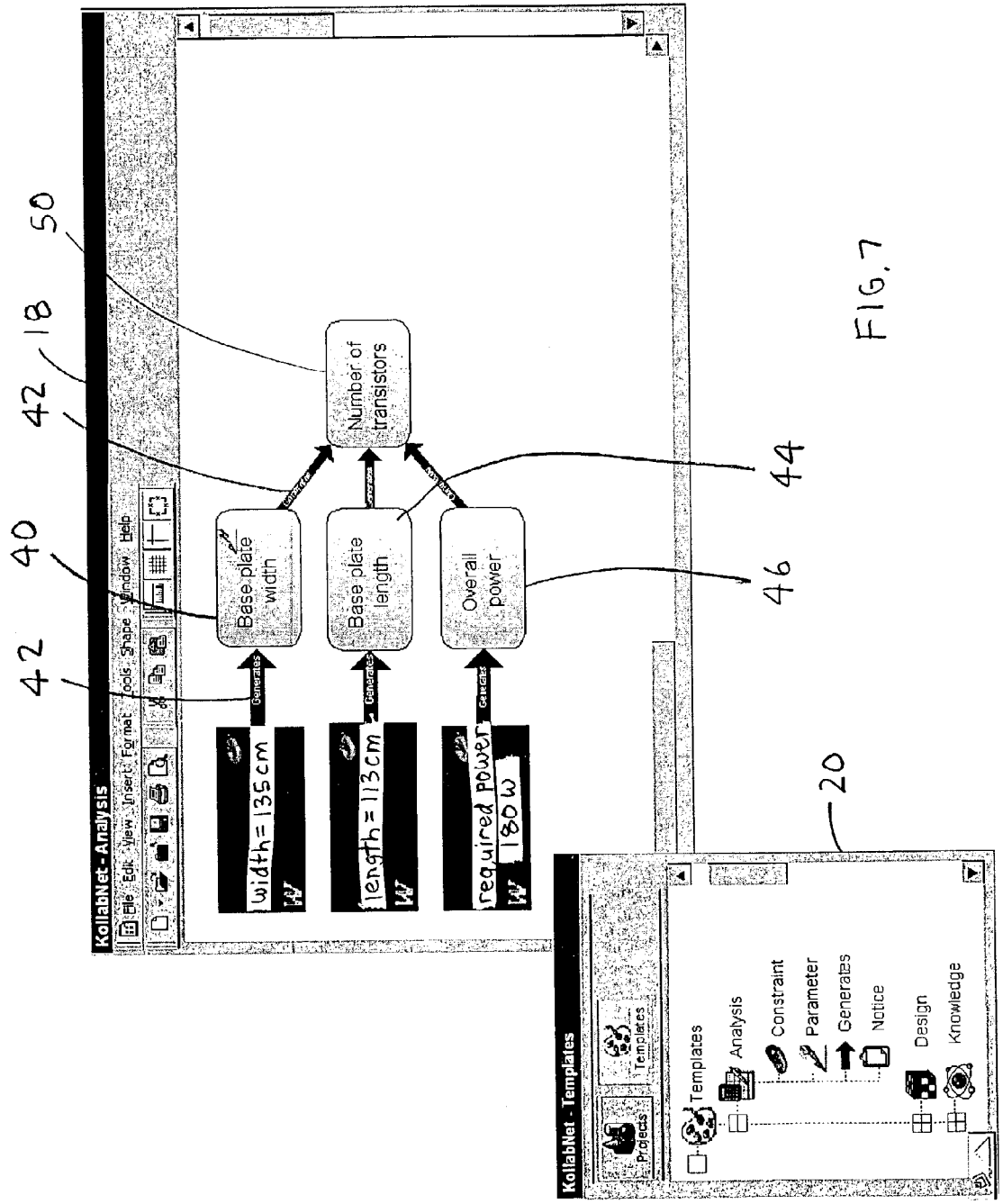
FIG. 7 is a front view of an icon palette and symbolic modeling window with a design block that receives input from three other design blocks.

A design block 50 labeled "number of transistors" appears in FIG. 7. The design block 50 was created by transferring a parameter symbol from the icon palette 20 to the symbolic modeling window 18. The name, "number of transistors" is entered into the pop-up menu and a formula is also entered into the pop-up menu. The formula yields the number of transistors as provided by design blocks 42, 44 and 46. The generates symbol 42 transfers the data from design blocks 42, 44, and 46 to the formula in the design block 50.

Figure 8:
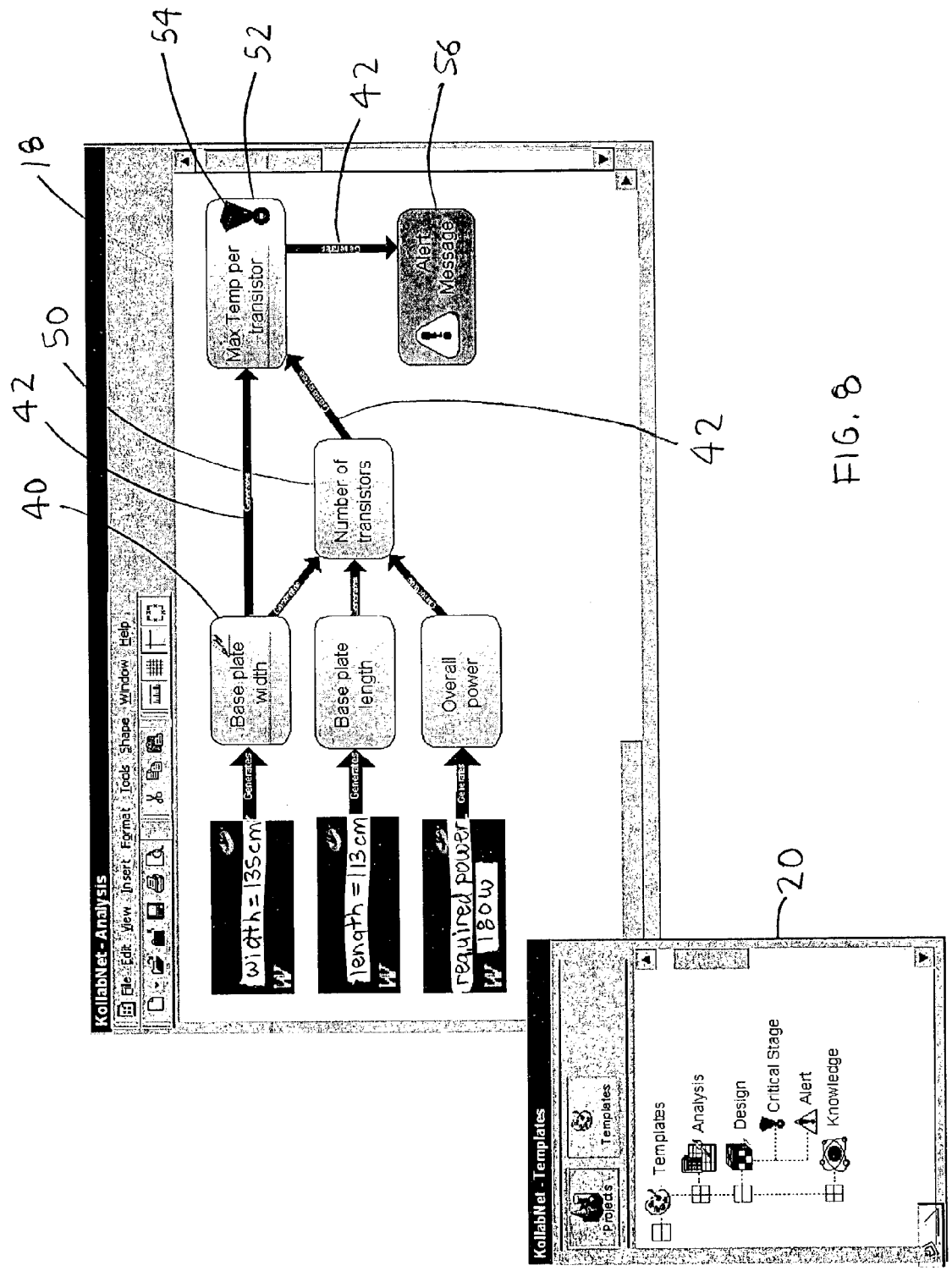
FIG. 8 is a front view of an icon palette and a symbolic modeling window with a design block that receives input from three other design blocks.

A design block 52 labeled "Max Temp per transistor" appears in FIG. 8. The design block 52 was created by transferring a parameter symbol from the icon palette 20 to the symbolic modeling window 18. The name, "Max Temp per transistor" is entered into the pop-up menu and a logical formula is also entered into the pop-up menu. The logical formula could be "Temp>X degrees then perform some operation." A critical stage symbol 54 is added to design block 52 by transfer from the icon palette 20. The critical stage symbol 54 allows all boxes containing thereof to be searched. The design block 52 receives input from the design block 40 and the design block 50 through generates symbols 42. An alert symbol is transferred to the symbolic modeling window 18 from the icon palette 20. The alert symbol is displayed as a message block 56. The message block 56 receives input through the generates symbol 42. If the temperature exceeds X degrees then a message is sent by a message block 56. The message could be an e-mail to a chief engineer that a design parameter has been exceeded, a flashing box, or any other suitable alert. Numerous alert messages may also be stored in the icon palette 20.

Figure 9:
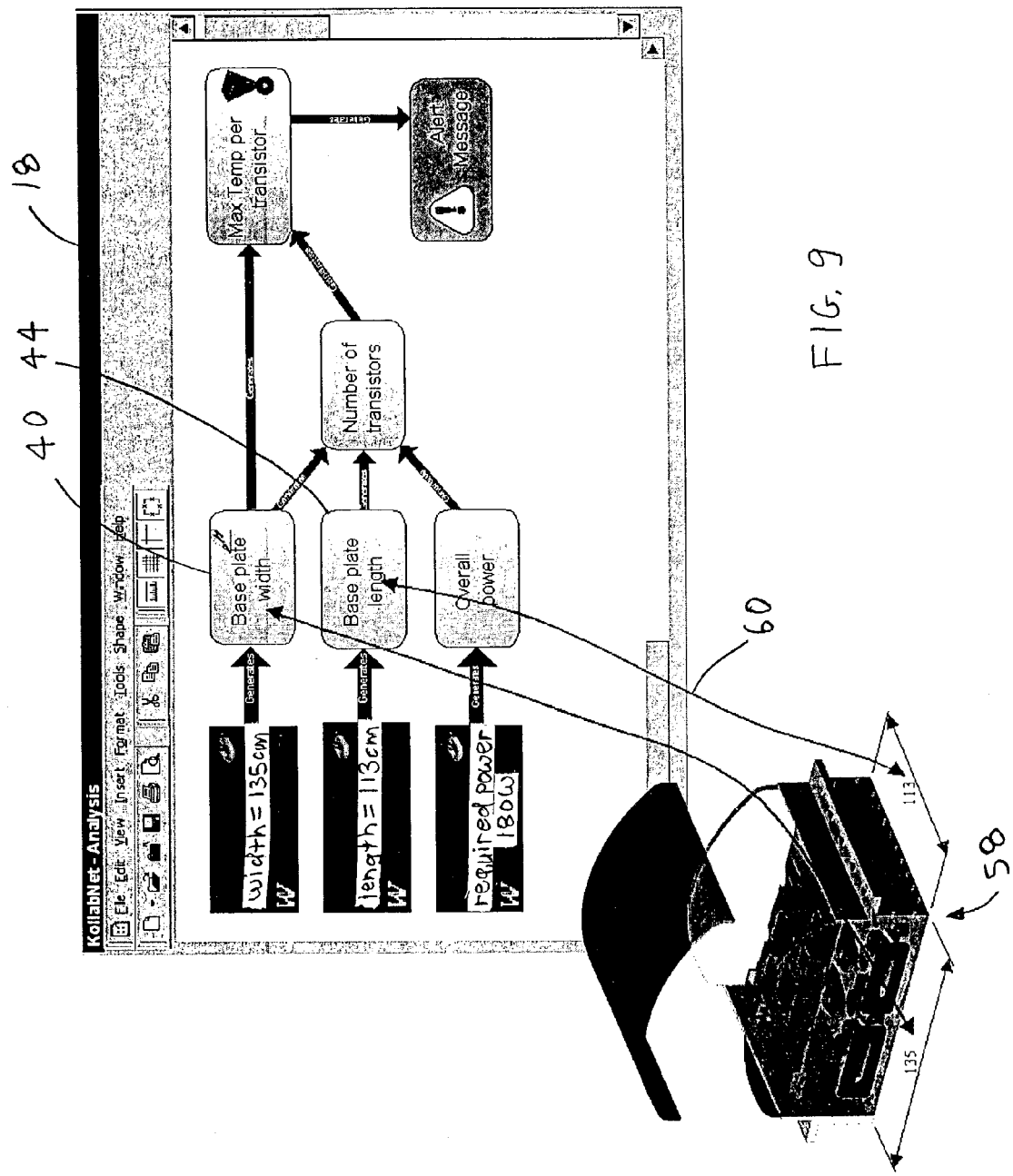
FIG. 9 is a front view of a symbolic modeling window and a perspective view of a CAD model that have been illustratively linked.
Figure 10:
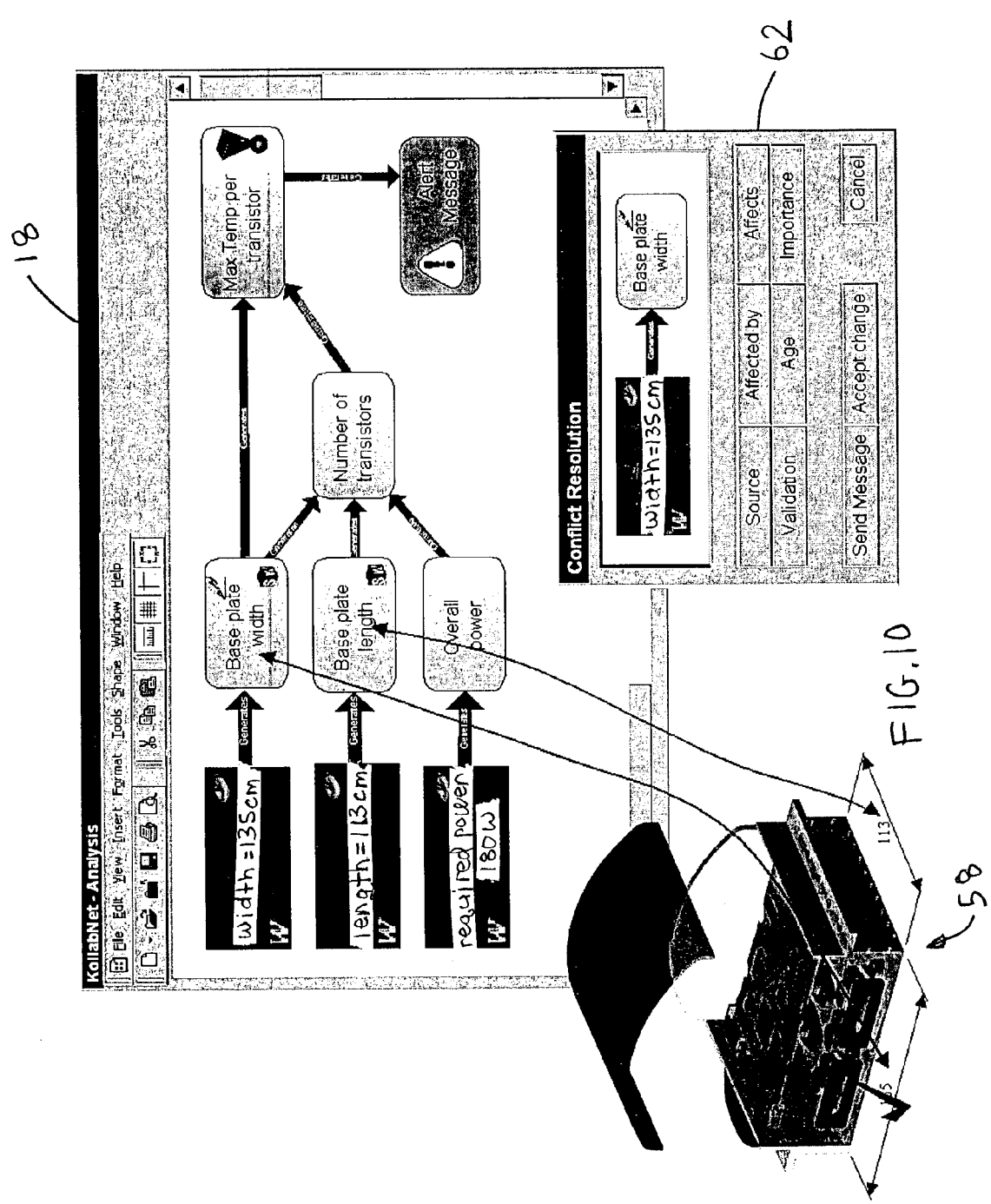
FIG. 10 is a front view of a symbolic modeling window, a perspective view of a CAD model, and a conflict resolution window.
Figure 11:
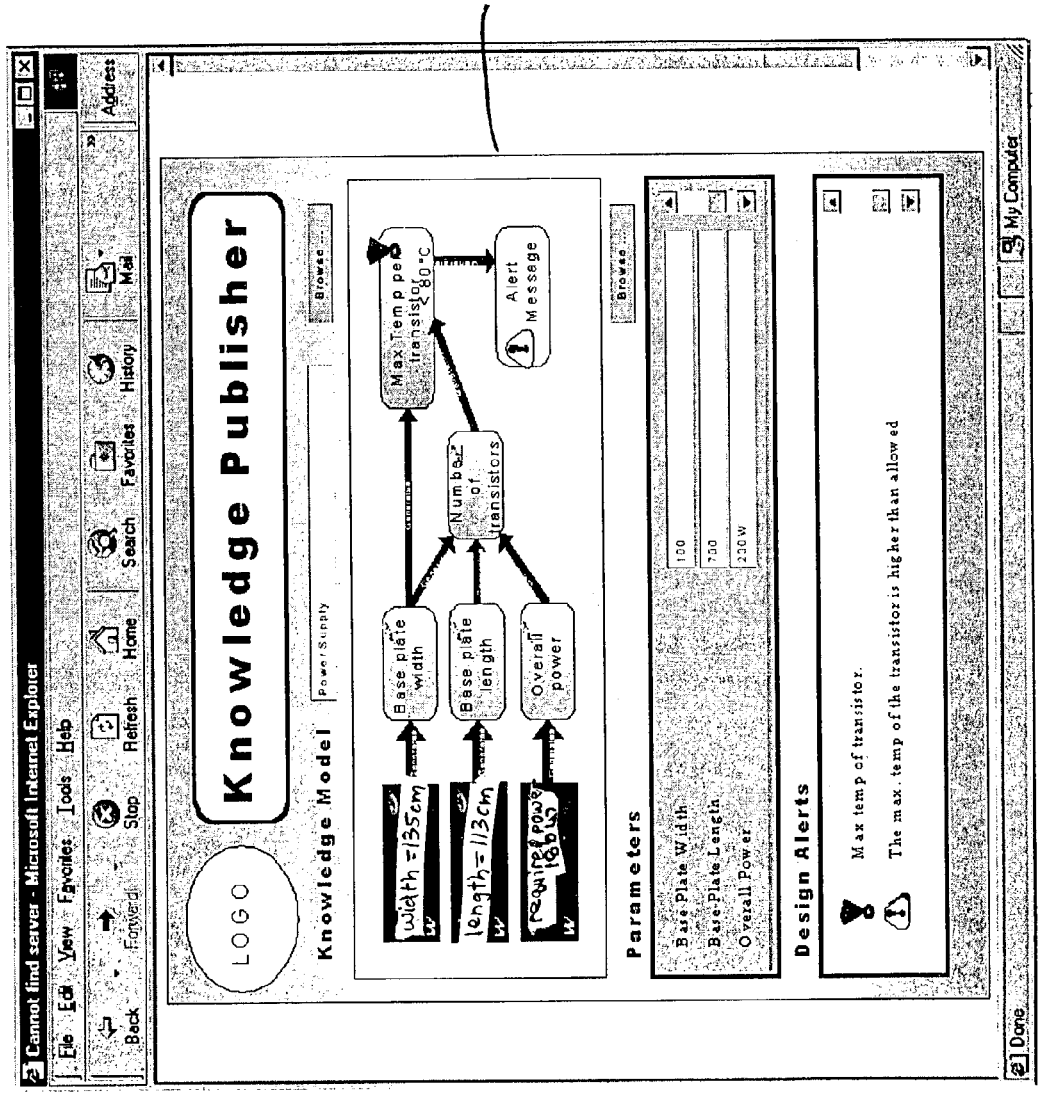
FIG. 11 is a front view of a window containing a knowledge publisher.
Figure 12:
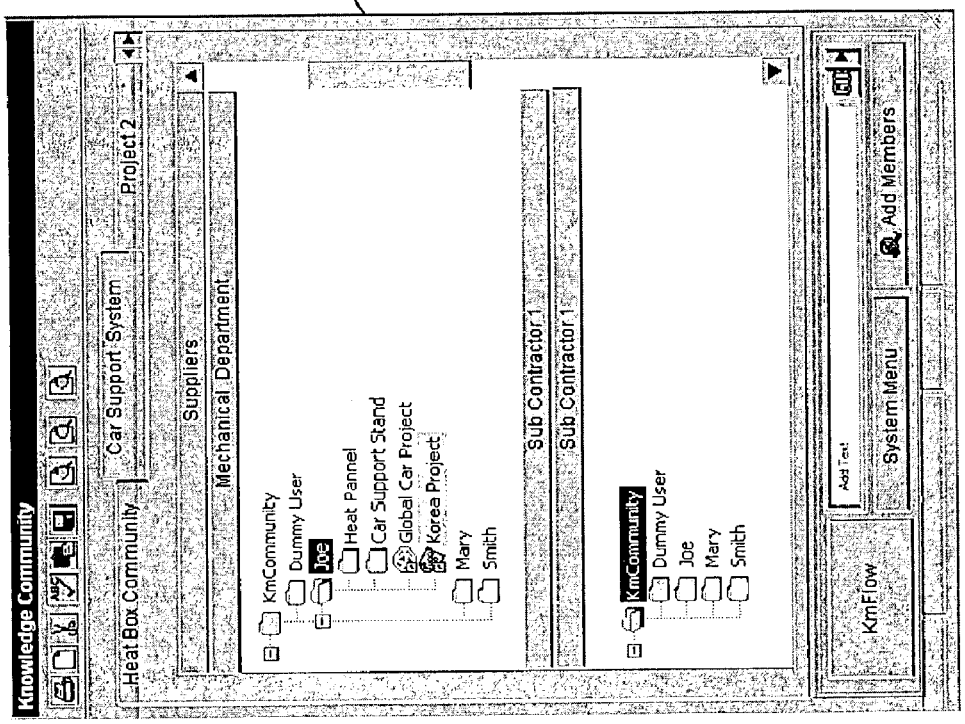
FIG. 12 is a front view of a window containing a community agent.

With reference to FIG. 9, a CAD model 58 may be linked to the design model. The CAD model 58 does not actually appear on the same window as the symbolic modeling window 18 as shown in FIG. 9. The base plate width and the base plate length of the CAD model 58 may be linked with the input document 16 that originally specified the width and length dimensions. To establish a link 60 between the CAD model 58 and the input document 16, the dimension is preferably marked in the input document and transferred to the CAD model 58. A pop-up menu (not shown) allows the CAD model 58 and input document 16 to be linked in one or both directions. If linked in one direction, a change in a first document will cause a change in a second document, but a change in the second document will not cause a change in the first document. If linked in both directions, a change implemented in one document will be implemented in the other document. An equation may be inserted into the link 60. The equation would take one or more parameters and produce a result that would be entered into the document on the other end of the link 60. With reference to FIG. 10, a conflict-resolution box 62 appears when there is a conflict between design parameters. With reference to FIG. 11 a knowledge publisher 64 is accessible through the Internet. The knowledge publisher allows a user to access the design model of a particular project, but does not allow the design model to be modified. With reference to FIG. 12, a community agent 66 allows multiple users to work on the design model of a particular project. The community agent 66 is preferably accessed through the Internet.

Figure 13:
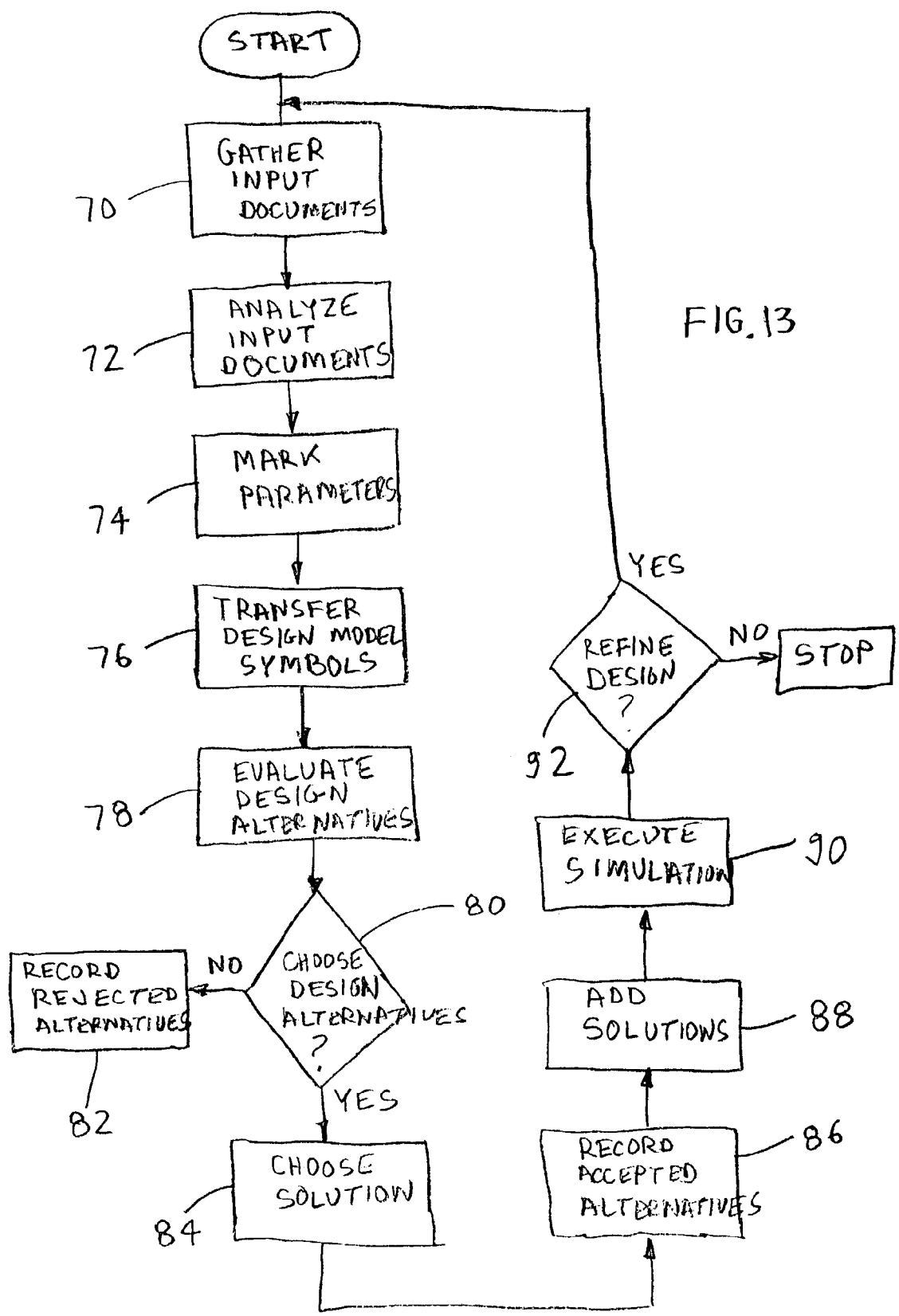
FIG. 13 is a flow chart of a design process utilizing a symbolic conceptual design model development environment.

FIG. 13 shows a procedural flow chart of the steps a user might go through when utilizing the symbolic conceptual design model development environment 1. A designer receives a variety input documents in box 70. The designer analyzes the input documents in box 72. The designer then chooses parameters in each input document to mark in box 74. The designer then transfers design model symbols from the icon palette 20 to the symbolic modeling window 18 in box 76. The designer then evaluates design alternatives in box 78. Some design alternatives are rejected in decision box 80. However, the rejected design alternatives and reasons for their rejection are recorded as part of the project file in box 82. A solution is chosen from among the acceptable design alternatives in box 84. The acceptable design alternatives and reasons for their choice are added to the project file in box 86. Methods for developing the solution are added to project file in box 88. The project file is "executed" as a simulation that provides feedback for refining the design model in box 90. The designer will choose to refine or stop the design process in decision box 92. If the design is acceptable the design process will stop; if design process needs to be refined, the process will start over again in decision box 92.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of creating a design model through a symbolic design model process, comprising the steps of:
 (a) entering at least two design blocks onto a symbolic modeling display, each one of said at least two design blocks containing a design parameter of the design model;
 (b) relating said at least two design blocks to form the design model;
 (c) executing a simulation to evaluate the design model to provide feedback for refining the design model;
 (d) choosing design alternatives to the design model; and
 (e) recording any design alternative which was made during the symbolic design model process.

2. The method of creating a design model through a symbolic design model process of claim 1, further comprising the steps of:
 (f) importing at least one input document into said symbolic design model process from a source outside said symbolic design model process, marking at least one of a parameter and a constraint of interest within said input document, creating a link between said at least one input document and at least one design block, said link allowing changes to be made in at least one direction.

3. The method of creating a design model through a symbolic design model process of claim 2, further comprising the steps of:
 (g) said link allowing changes to be made on one end of the link to be reflected on the other end thereof.

4. The method of creating a design model through a symbolic design model process of claim 1, further comprising the steps of:
 (f) reporting any conflict between the at least two design blocks.

5. The method of creating a design model through a symbolic design model process of claim 1, further comprising the steps of:
 (f) prompting a user to enter reasons for choosing or not choosing a design alternative, said reasons being recorded as a part of the symbolic design model process.

6. A method of creating a design model through a symbolic design model process, comprising the steps of:
 (a) importing at least one input document into said symbolic design model process from a source outside said symbolic design model process, marking at least one of a parameter and a constraint of interest within said input document;
 (b) entering at least two design blocks onto a symbolic modeling display, each one of said at least two design blocks containing a design parameter of the design model;
 (c) creating a link between said at least one input document and at least one of said two design blocks, said link allowing changes to be made on one end of the link to be reflected on the other end thereof;
 (d) relating said at least two design blocks to form the design model; and
 (e) executing a simulation to evaluate the design model to provide feedback for refining the design model.

7. The method of creating a design model through a symbolic design model process of claim 6, further comprising the steps of:
(f) recording any design alternative which was made during the symbolic design model process.

8. The method of creating a design model through a symbolic design model process of claim 7, further comprising the steps of:
(f) reporting any conflict between the at least two design blocks.

9. The method of creating a design model through a symbolic design model process of claim 7, further comprising the steps of:
(f) prompting a user to enter reasons for choosing or not choosing a design alternative, said reasons being recorded as a part of the symbolic design model process.

10. A method of creating a design model through a symbolic design model process, comprising the steps of:
(a) inputing at least two design blocks onto the symbolic modeling display, each one of said at least two design blocks containing a design parameter of the design model;
(b) relating said at least two design blocks to form the design model;
(c) executing a simulation to evaluate the symbolic design model to provide feedback for refining the design model; and
(d) reporting any conflict between the at least two design blocks.

11. The method of creating a design model through a symbolic design model process of claim 10, further comprising the steps of:
(e) importing at least one input document into said symbolic design model process from a source outside said symbolic design model process, marking at least one of a parameter and a constraint of interest within said input document, creating a link between said at least one input document and at least one design block, said link allowing changes to be made in at least one direction.

12. The method of creating a design model through a symbolic design model process of claim 11, further comprising the steps of:
(f) said link allowing changes to be made on one end of the link to be reflected on the other end thereof.

13. The method of creating a design model through a symbolic design model process of claim 11, further comprising the steps of:
(e) prompting a user to enter reasons for choosing or not choosing a design alternative.

14. The method of creating a design model through a symbolic design model process of claim 10, further comprising the steps of:
(e) recording any design alternative which was made during the symbolic design model process.

15. A method of creating a design model through a symbolic design model process, comprising the steps of:
(a) entering at least two design blocks onto a symbolic modeling display, each one of said at least two design blocks containing a design parameter of the design model;
(b) relating said at least two design blocks to form the design model;
(c) executing a simulation to evaluate the design model to provide feedback for refining the design model;
(d) choosing design alternatives to the design model; and
(e) prompting a user to enter reasons for choosing or not choosing a design alternative, said reasons being recorded as a part of the symbolic design model process.

16. The method of creating a design model through a symbolic design model process of claim 15, further comprising the steps of:
(f) importing at least one input document into said symbolic design model process from a source outside said symbolic design model process, marking at least one of a parameter and a constraint of interest within said input document, creating a link between said at least one input document and at least one design block, said link allowing changes to be made in at least one direction.

17. The method of creating a design model through a symbolic design model process of claim 16, further comprising the steps of:
(g) said link allowing changes to be made on one end of the link to be reflected on the other end thereof.

18. The method of creating a design model through a symbolic design model process of claim 16, further comprising the steps of:
(f) reporting any conflict between the at least two design blocks.

19. The method of creating a design model through a symbolic design model process of claim 15, further comprising the steps of:
(f) recording any design alternative which was made during the symbolic design model process.

* * * * *